United States Patent [19]

Machnee

[11] 4,432,675
[45] Feb. 21, 1984

[54] PNEUMATIC FEED CONTROL FOR PNEUMATIC SEEDER AND THE LIKE

[75] Inventor: Cecil B. Machnee, Yorkton, Canada

[73] Assignee: Morris Rod-Weeder Co. Ltd., Yorkton, Canada

[21] Appl. No.: 374,131

[22] Filed: May 3, 1982

[30] Foreign Application Priority Data

Nov. 20, 1981 [CA] Canada ................................. 390527

[51] Int. Cl.³ ............................................ B65G 53/66
[52] U.S. Cl. ......................................... 406/30; 111/1;
111/67; 221/13; 221/151; 221/278; 239/655
[58] Field of Search ...................... 406/29, 30; 239/69,
239/654, 655; 111/1, 34, 67; 221/13, 151, 278

[56] References Cited

U.S. PATENT DOCUMENTS 2,827,333  3/1958  Wallin ................................... 406/30
4,137,853  2/1979  Peterson ............................... 111/67
4,353,667  10/1982 Mandl et al. ...................... 406/30 X Primary Examiner—Jeffrey V. Nase
Attorney, Agent, or Firm—Jones, Tullar & Cooper

[57] ABSTRACT

The invention relates to improvements in air seeders, namely agricultural implements which utilize air pressure to move particulate material such as seeds from a feed zone to a dispersal or planting zone. The particulate material is normally fed from a hopper by a driven feed wheel or other similar mechanism. The invention provides a pressure pick-up at the source of air pressure, a conduit connecting the pick-up with a pneumatic actuator and a suitable linkage connecting the actuator with a clutch which is used to transmit drive power to the feed wheel. As long as there is sufficient pressure at the source the actuator will keep the clutch positioned to permit the feed wheel to operate. Should the pressure source fail the actuator will operate the clutch to stop transmitting power to the feed wheel and thus terminate the feeding of material which would otherwise clog the delivery conduits of the seeder.

14 Claims, 8 Drawing Figures

PNEUMATIC FEED CONTROL FOR PNEUMATIC SEEDER AND THE LIKE

The present invention relates in general to the control of agricultural equipment and more specifically to the control of implements such as pneumatic seeders, fertilizer applicators and/or chemical applicators.

BACKGROUND OF THE INVENTION

There are several types of agricultural machines on the market which rely on machine-generated pneumatic pressure for effective operation. One such machine is the so-called "air seeder", a machine which meters and distributes, via a stream of pressurized air, seeds to ground openers for the purpose of planting the seeds. Such machines or others based on similar principles of operation can be used for application of fertilizers and chemicals to the ground. The application of fertilizers and chemicals, if done by way of an air seeder, can be accomplished simultaneously with the planting of the seeds if desired.

On many existing air seeders problems can arise should the air supply system fail. Since such seeders normally feed the seeds mechanically into the pneumatic delivery conduit failure to stop such mechanical feed when the air supply stops can result in a jammed or blocked delivery conduit, which is often difficult and time consuming to unplug, and which in turn can cause damage to the mechanical feed.

SUMMARY OF THE INVENTION

The present invention overcomes these problems of the prior art by interconnecting the control for the mechanical feed mechanism and the air supply so that should the air supply fail for any reason whatsoever the mechanical feed will stop and no additional seeds will be fed into the delivery conduit. Should the air supply fail all the seeds in the delivery conduit will stop their forward motion at the predetermined spacing as controlled by the feed and, more importantly no additional seeds will enter the delivery conduit, which seeds would otherwise accumulate and pile up to block the conduit in the absence of the pneumatic flow which would otherwise carry the seeds along the conduit.

The invention may be incorporated in new equipment or it may be added with very little difficulty to existing seeder equipment as an improvement thereto. The invention involves the provision of a suitable pick-up, such as a pitot tube, which is positioned within the source of pressurized air and which provides a pressure within a line which leads to a control unit or actuator. The control unit could be a pneumatic cylinder or a diaphragm chamber, the output of which is connected to a clutch unit which in turn is adapted to transmit mechanical power to the feed unit. When the pressure line is pressurized the clutch will operate so as to effect operation of the feed unit but should there be a failure of the air supply the clutch unit will operate so as to disengage the drive unit from the feed unit and thus stop the feed unit, thereby preventing the entry of any additional seeds into the delivery conduit.

Various valves can be incorporated into the pressure line so that control of various mechanisms can be achieved or so that the operator can deliberately disengage the mechanical feed even though the pressure source is still operative.

Broadly speaking therefore the present invention provides in an agricultural implement for dispensing particulate material and having: feed means for feeding predetermined amounts of the material to a delivery conduit, drive means for the feed means, a source of air under pressure, and air conduit means connecting the source with the delivery conduit to aid in the passage of fed material along the delivery conduit; the improvement comprising clutch means located between the drive means and the feed means, pneumatic actuator means operatively connected to the clutch means, pressure pick-up means located within the source, and pressure conduit means connecting the pick-up means with the actuator means, whereby pressure transmitted from the pick-up means to the actuator means permits the actuator means to maintain the clutch means in a position to connect the drive means with the feed means, but a negative pressure change at the source will cause the actuator means to operate the clutch means to disconnect the drive means for the feed means to thereby terminate the feeding of the material.

DESCRIPTION OF THE PREFERRED EMBODIMENT

Figure 1:
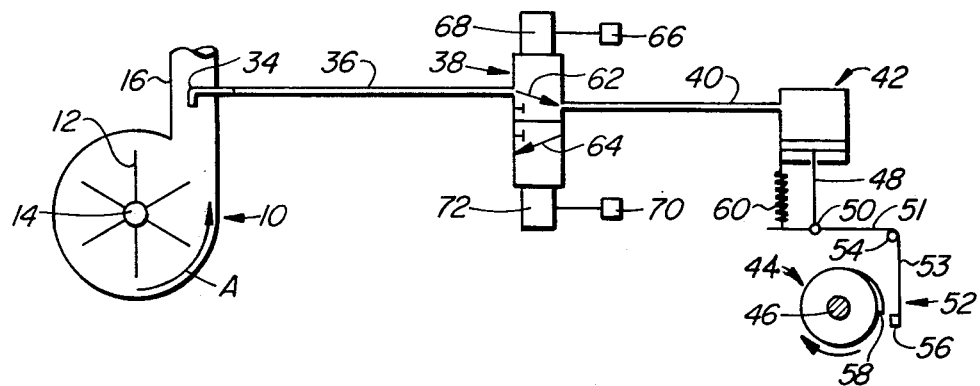
FIG. 1 shows the basic concept of the present invention with a pneumatic cylinder type of clutch actuator.

FIG. 1 is intended to illustrate, purely in schematic form, the principles on which the present invention operates. It is understood that while particularly applicable to air seeders, of which there are many varieties, the invention could be applicable to other analogous equipment.

Figure 8:
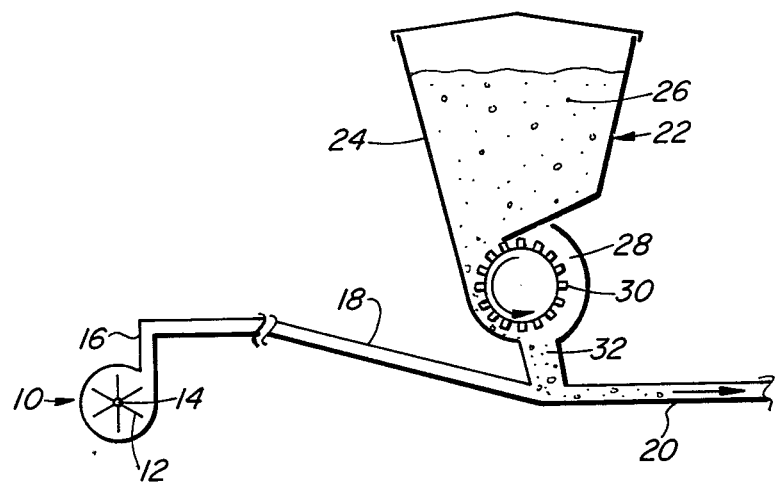
FIG. 8 shows schematically the principles of operation of an air seeder without the present invention incorporated therein.

FIGS. 1 and 8 first of all illustrate a source of pressurized air which, for the sake of simplicity, is illustrated as a centrifugal blower 10. Such a blower could be directly powered by the engine of the tractor which carries or pulls the air seeders; it could be powered by a "power take off" (PTO) mechanism; it could have its own source of power such as a battery-operated electric motor or an auxiliary fuel powered motor; or it could be ground driven. The blower 10 is shown as having vanes 12 which are attached to the shaft 14 and as the shaft rotates according to the arrow A air is forced into the outlet 16 so as to create a pressurized flow of air, which air is conducted via a suitable line or tube 18 (FIG. 8) to the delivery conduit 20 of the seeder 22. Seeds introduced into the delivery conduit 20 are transported therealong by the pressurized air to the lower end of the delivery conduit 20 where they exit into a furrow prepared by a coulter or other suitable mechanism to which the seeder is attached.

As shown in FIG. 8 the seeder 22 includes a hopper 24 which contains the seeds 26 to be planted. At the exit from the hopper a feed wheel 28 is provided which wheel has means such as studs or flutes 30 around the periphery. The studs define therebetween pockets which, as the wheel 28 rotates, pick up seeds from the hopper and deposit them at a rate determined by the stud spacing and the rotation speed into the entranceway 32 of the delivery conduit from which they are transported pneumatically to the planting site. Other feed mechanisms are well known and the present invention may be used therewith, such other mechanisms including rubber rollers, augers, belts or agitators.

It is clear that if there is a failure of the pneumatic system and the feed means as described continues to operate, the passage of seeds through the delivery conduit 20 could slow down to the point where the fed seeds can no longer pass through the delivery conduit and the accumulated seeds plug the delivery conduit.

The present invention involves the addition of certain equipment to the basic air seeder structure. Specifically, as shown in FIG. 1 a pressure pick-up device such as pitot tube 34 is located in the blower outlet 16 so as to pick up for transmission pressurized air from the outlet 16. The pitot tube 34 should be positioned in such a manner that the pressure transmitted thereby is maximized. A flow tube 36 extends from the pitot tube 34 to a pneumatic valve 38 the purpose of which will be described hereinbelow. With the valve 38 actuated as shown the pressure from the pitot tube is transmitted via the flow tube 40 to a pneumatic cylinder 42 located adjacent the drive mechanism for the feed wheel 28.

A clutch mechanism, such as a spring-wrap clutch 44 (well known in the agricultural field) is positioned between the power source (not shown) for the feed wheel 28 and the wheel 28 itself, preferably on a drive shaft 46 for the feed wheel 28. The clutch 44 is intended to be controlled via the cylinder 42 and to that end the rod 48 extending from the cylinder is pivotally connected as at 50 to one leg 51 of a lever arm 52, the other leg 53 of which extends at right angles to the leg 51, the lever arm 52 being pivotally connected to the seeder structure as at 54. The leg 53 carries a dog 56 for cooperation with a corresponding dog or tang 58 on the spring of the clutch 44 such that when the dogs 56, 58 are apart the spring of the clutch will wrap down to connect the drive with the feed wheel so as to permit operation of the feed wheel 28. A tension spring 60 has one end connected to the outer end of leg 51 and the other end connected to the seeder structure or to the cylinder 42 and is intended to bias the lever arm in a direction tending to effect engagement of the dogs 56, 58.

Insofar as the valve 38 and its function is concerned it should be understood that air seeders are usually assembled to and are used in conjunction with mechanisms such as coulters or cultivators which prepare the soil for reception of the seed, as by preparing a furrow to a required depth. Thus the seeder should operate ony when the furrow, or the equipment creating the furrow, is at the correct depth relative to a predetermined datum such as the ground surface. Also, such equipment usually is pivotable away from the ground surface to provide adequate clearance for transportation purposes. The valve 38 is provided and operates so as to ensure that the seeder feeds seeds for planting only at the correct time, that is when the coulter or other preparation device is at the correct depth. By using the valve 38 in conjunction with the pneumatic feed control of this invention, improvements in flexibility, versatility and cost effectiveness are achieved since, in the past, the mechanical systems which controlled the feed mechanism in conjunction with the raising and lowering of the cultivator were complex, bulky, expensive and awkward in use.

In the drawings the valve 38 is shown schematically only since various types of commerically available valves could be used. Also, the connections and devices which effect operation of the valve are shown schematically only since such will depend on the equipment configuration being utilized and the exact structure thereof does not form a part of this invention.

The valve 38 is shown as having two internal flow passages 62 and 64. In the position of the valve 38 as in FIG. 1 the passage 62 interconnects the flow tubes 36 and 40. The valve 38 will be in the position shown in FIG. 1 only when the ground is ready to receive seeds, namely when the seeder equipment is positioned at the correct depth. When that depth has been reached a suitable control moves the valve 38 to the position shown. Such control could include a position sensor 66 which actuates a solenoid 68 to move the valve as required. Should the operator raise the seeder, or should it encounter a situation which causes it to raise, a second sensor 70 will cause a second solenoid 72 to drive the valve body in the opposite direction until the passage 64 is aligned with the flow tube 40 and the interconnection between the flow tubes 36 and 40 is broken. Of course, movement of the valve 38 could be effected purely mechanically as by way of suitable linkages interconnecting the valve 38 with the portions of the seeder which are movable relative to the predetermined datum.

The operation of the invention according to FIG. 1 should be readily apparent from the foregoing. With the seeder at the correct depth and the valve 38 positioned as shown the pitot tube 34 will pick up sufficient pressure from the blower 10 for transmission to the cylinder 42 such as to force the piston therein downwardly.

That position is shown in FIG. 1 wherein the lever arm 52 has pivoted about the pivot 54 so that the dogs 56, 58 are disengaged. As described above the lack of engagement between the dogs 56, 58 permits the spring of the clutch 44 to wrap down so as to connect the input member of the clutch (the drive means) with the output member of the clutch (the feed wheel 28) directly or indirectly.

Should the blower 10 stop functioning for any reason the pressure in the tubes 36, 40 will no longer be sufficient to pressurize the cylinder 42 enough to overcome the return bias of the spring 60. The spring 60 will then cause the lever arm to pivot about 54 and the dogs 56, 58 will be brought into engagement, causing the spring of the clutch to open thereby stopping the transmission of power to the feed wheel. Thus should there be a failure in the air supply the feed mechanism will immediately cease to function and no more seeds will pass into the delivery conduit 20.

Should the seeder be raised from its operative orientation even though there be no failure of the air supply the valve 38 will move from its illustrated orientation under the influence of the solenoid 72 or by a mechanical linkage to bring the passage 64 into registry with the flow tube 40 thereby venting the flow tube 40 and the cylinder 42 to atmosphere and causing the clutch 44 to stop the feed wheel 28 as described above.

Figure 2:
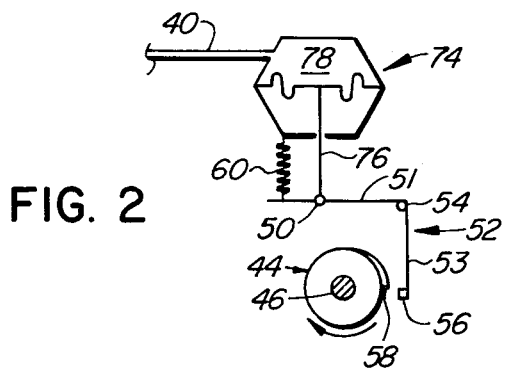
FIG. 2 shows a diaphragm type of actuator for use in the system of FIG. 1.

FIG. 2 illustrates an alternative operator for the clutch 44. In this case a diaphragm operator 74, such as is used in automotive "hide away" headlight systems, is connected via its rod 76 to the lever arm 52. The chamber 78 of the diaphragm operator is connected to the flow tube 40 and the operation of this alternative embodiment is the same as for the FIG. 1 embodiment.

Figure 3:
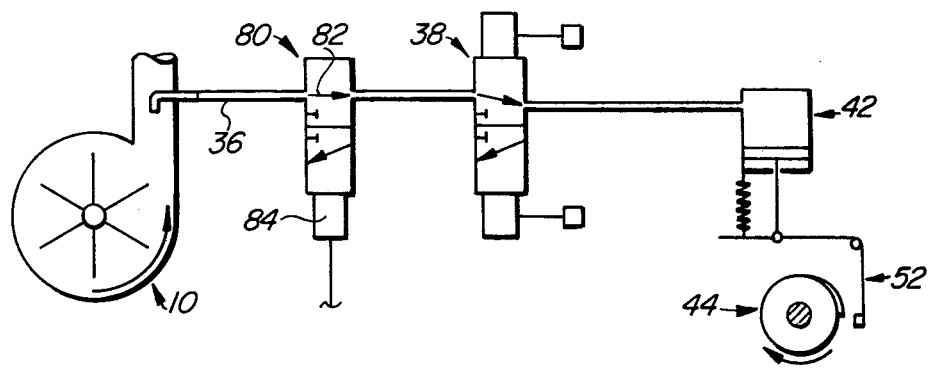
FIG. 3 shows the system of FIG. 1 with a shut off valve added.

FIG. 3 shows an embodiment similar to that of FIG. 1 but with the addition of a control valve 80 in the flow tube 36. Valve 80 has a passage 82 which provides for continuation of the flow tube 36 in the position shown in FIG. 3. The valve includes an actuator 84 (electrical or mechanical) which is remotely operable by the machine operator. Should the operator wish to stop the feed wheel 28 he could actuate the valve 80 so as to interrupt the flow line 36, thereby causing the downstream portions of the flow lines to vent to atmosphere causing the clutch to stop rotation of the feed wheel 28. By providing the valve 80 the present invention thus achieves either automatic or manual control of the feed wheel 28. This feature is advantageous when the operator wishes to till the soil without seeding or depositing any material while a seeding or depositing operation is otherwise underway.

Figure 4:
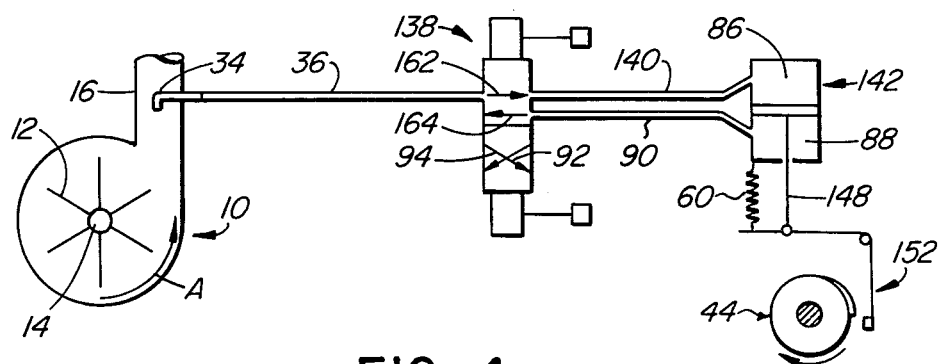
FIGS. 4 to 6 correspond respectively to FIGS. 1, 2 and 3 and show a second embodiment of the present invention.
Figure 5:
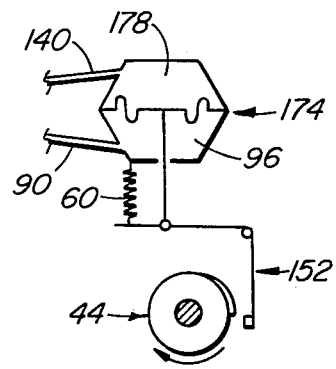
Figure 6:
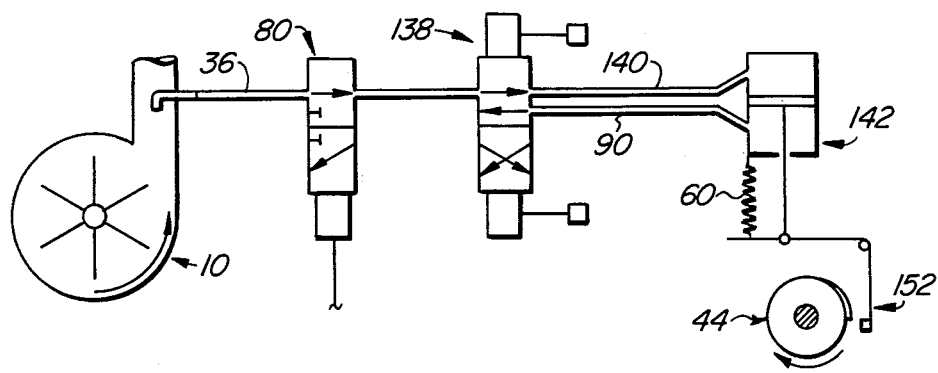

The embodiments of FIGS. 4, 5 and 6 are essentially variations of those shown in FIGS. 1, 2 and 3 respectively, the changes relating to the manner of achieving clutch engagement and disengagement. In the embodiments of FIGS. 4, 5 and 6 the cylinder or diaphragm operator is double-acting whereas in the embodiments of FIGS. 1, 2 and 3 they are single-acting. Thus in FIG. 4 the drive chamber 86 of cylinder 142 is connected to the flow line 140 for positive downward movement of the cylinder rod 148 so as to effect appropriate movement of the lever arm 152 to bring the clutch into position for operation of the feed wheel 28. The return chamber 88 of cylinder 142 is connected to a flow line 90 which is normally vented to atmosphere through the passage 164 in the valve 138. Passage 162 in the valve 138 normally interconnects the flow lines 36 and 140. The valve 138 also has internal passages 92 and 94 which, if the valve 138 is moved upwardly will (a) interconnect flow line 36 with flow line 90 and (b) vent flow line 140 to atmosphere, respectively. In this condition the positive pressure operating on the underside of the cylinder piston in return chamber 88 will augment the return bias of spring 60 to effect appropriate movement of the lever arm 152 to cause the clutch to stop the feed wheel 28.

FIG. 5 shows a diaphragm operator 174 which operates in the same manner as cylinder 142, with the upper or drive chamber 178 connected to the flow line 140 and the lower or return chamber 96 connected to the flow line 90.

In FIG. 6 it is seen that a remotely controlled valve 80 can be introduced into the flow line 36 in the same manner as in the embodiment of FIG. 3.

Figure 7:
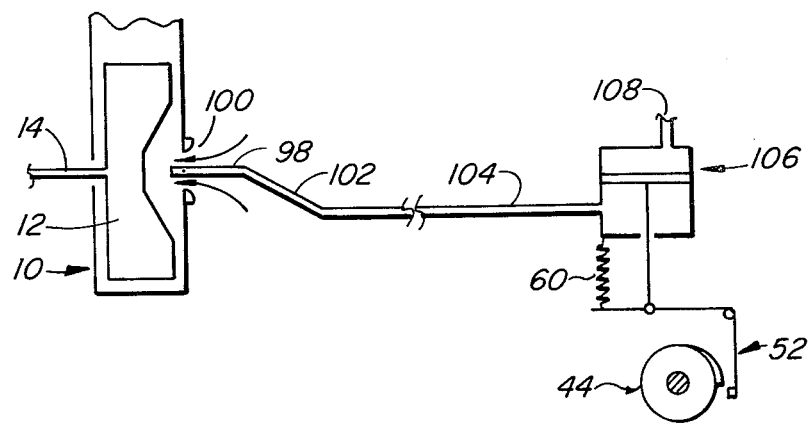
FIG. 7 shows an alternative embodiment for obtaining an operational pressure.

In the embodiment of FIG. 7 an aspirator tube 98 is positioned in the inlet 100 to the blower 10 and reliance is thus made on a reduced pressure or vacuum in the flow lines 102, 104 to effect operation of an actuator such as cylinder 106. Since the medium used is negative rather than positive pressure the line 104 would be connected on the rod side of the piston within the cylinder and the other side of the cylinder would be vented to atmosphere as at 108. Operation of such an embodiment would be essentially the same as with the other embodiments described and suitable additional control valves similar in function to the valves 38 and 80 can be provided.

The above provides the best description of the invention as presently available but it is understood the variations therein could occur to someone skilled in the art without departing from the spirit of the invention. Accordingly, the scope of protection to be afforded the invention is to be determined from the claims appended hereto.

The embodiments of the invention in which an exclusive property or privilege is claimed are defined as follows:

1. In an agricultural implement for dispensing particulate material and having: feed means for feeding predetermined amounts of said material to a delivery conduit, drive means for said feed means, a source of air under pressure, and air conduit means connecting said source with said delivery conduit to aid in the passage of fed material along said delivery conduit; the improvement comprising clutch means located between said drive means and said feed means, pneumatic actuator means operatively connected to said clutch means, pressure pick-up means located within said source, and pressure conduit means connecting said pick-up means with said actuator means, whereby pressure transmitted from said pick-up means to said actuator means permits said actuator means to maintain said clutch means in a position to connect said drive means with said feed means, but a negative pressure change at said source will cause said actuator means to operate said clutch means to disconnect said drive means from said feed means to thereby terminate the feeding of said material.

2. The improvement of claim 1 wherein said actuator means is a single-acting pneumatic cylinder having an output rod thereof pivotally connected to a spring-biased pivotable lever arm, said lever arm being operatively connectable with said clutch means for control thereof.

3. The improvement of claim 1 wherein said actuator means is a single-acting diaphragm operator having an output rod thereof pivotally connected to a spring-biased pivotable lever arm, said lever arm being operatively connectable with said clutch means for control thereof.

4. The improvement of claim 1, 2 or 3 and including valve means responsive to the position of said delivery conduit relative to a datum, said valve means being positioned in said pressure conduit means, said valve means permitting pressurization of said pressure conduit means and said actuator means when said delivery conduit is correctly positioned relative to said datum, and venting said pressure conduit means and said actuator means to atmosphere to terminate the feeding of said material when said delivery conduit is incorrectly positioned relative to said datum.

5. The improvement of claim 1, 2 or 3 and including an operator-controllable valve positioned in said pressure conduit means, said valve normally permitting pressurization of said pressure conduit means and being selectively movable by the implement operator to a position to vent said pressure conduit means and said actuator means to atmosphere so as to terminate the feeding of said material.

6. The improvement of claim 1, 2 or 3 and including independent first and second valve means positioned serially in said pressure conduit means, both valve means normally permitting pressurization of said pressure conduit means, said first valve means being movable to a position, in response to movement of said delivery conduit means from a correct to an incorrect position relative to a predetermined datum, for venting said pressure conduit means and said actuator means to atmosphere, and said second valve means being remotely controllable by the implement operator for movement to a position for venting said pressure conduit means and said actuator means to atmosphere, such venting through either of said valve means terminating the feeding of said material.

7. The improvement of claim 1 wherein said actuator means is a double-acting pneumatic cylinder having an output rod thereof pivotally connected to a spring-biased pivotable lever arm, said lever arm being operatively connectable with said clutch means for control thereof, said cylinder having a drive chamber normally connected to said pressure conduit means and a return chamber connected to a venting conduit means.

8. The improvement of claim 1 wherein said actuator means is a double-acting diaphragm operator having an output rod thereof pivotally connected to a spring-biased pivotable lever arm, said lever arm being operatively connectable with said clutch means for control thereof, said diaphragm operator having a drive chamber normally connected to said pressure conduit means and a return chamber connected to a venting conduit means.

9. The improvement of claim 7 or 8 and including valve means responsive to the position of said delivery conduit relative to a datum, said valve means being positionable so that (a) first and second passages therein are aligned with said pressure conduit means and said venting conduit means respectively to permit pressurization of said drive chamber and venting of said return chamber respectively when said delivery conduit is correctly positioned relative to said datum, or (b) third and fourth passages therein are aligned with said venting conduit means and said pressure conduit means respectively to permit pressurization of said return chamber and venting of said drive chamber respectively to terminate the feeding of said material when said delivery conduit is incorrectly positioned relative to said datum.

10. The improvement of claim 7 or 8 and including an operator-controllable valve positioned in said pressure conduit means, said valve normally permitting pressurization of said pressure conduit means and being selectively movable by the implement operator to a position to vent said pressure conduit means and said actuator means to atmosphere so as to terminate the feeding of said material.

11. The improvement of claim 7 or 8 and including independent first and second valve means positioned serially in said pressure conduit means, both valve means normally permitting pressurization of said pressure conduit means and said actuator drive chamber, said first valve means normally also venting said actuator return chamber but being movable to a position, in response to movement of said delivery conduit means from a correct to an incorrect position relative to a predetermined datum, for pressurizing said return chamber and venting said drive chamber to atmosphere, and said second valve means being remotely controllable by the implement operator for movement to a position for venting said pressure conduit means and said drive chamber to atmosphere, such movement of either of said valve means terminating the feeding of said material.

12. The improvement of claim 1, 2 or 3 wherein said pressure pick-up means is a pitot tube positioned within the outlet from said source.

13. The improvement of claim 7 or 8 wherein said pressure pick-up means is a pitot tube positioned within the outlet from said source.

14. The improvement of claim 1, 2 or 3 wherein said pressure pick-up means is an aspirator tube positioned within the air inlet to said source.

* * * * *